United States Patent [19]
Lieb et al.

[11] 3,865,246
[45] Feb. 11, 1975

[54] BICYCLE RACKS

[75] Inventors: Philip C. Lieb; David A. Kesselman, both of Mill Valley, Calif.

[73] Assignee: Rally Enterprises, Inc., Mill Valley, Calif.

[22] Filed: Feb. 20, 1973

[21] Appl. No.: 333,748

[52] U.S. Cl.......................................... 211/5, 85/61
[51] Int. Cl............................................. E05b 73/00
[58] Field of Search............... 211/5, 22, 17, 4, 8, 7, 211/19, 18, 20; 70/234, 233, 235; 85/61

[56] References Cited
UNITED STATES PATENTS

| 639,517 | 12/1899 | Butcher | 211/5 |
|---|---|---|---|
| 1,677,269 | 7/1928 | Burghart | 85/61 |
| 3,739,609 | 6/1973 | Kaufmann | 211/5 X |
| 3,749,295 | 7/1973 | Palmer | 211/5 X |
| 3,786,928 | 1/1974 | Johnson | 211/5 |

FOREIGN PATENTS OR APPLICATIONS
258,495   5/1949   Switzerland............................. 211/5

Primary Examiner—Ramon S. Britts
Attorney, Agent, or Firm—A. W. Breiner

[57] ABSTRACT

A rack for receiving and locking bicycles in place and in an upright position is described comprising a vertical or substantially vertical member secured to a base such as a sidewalk or floor, and spaced apart horizontal members extending from the top of said vertical member and being substantially parallel with said base for receiving a bicycle frame member to the rear of the bicycle sprocket. A cable is secured at one of its ends to the rack and is of sufficient length to loop the free end thereof through the front wheel of a bicycle positioned in the rack and back to the rack to be secured by a padlock.

9 Claims, 3 Drawing Figures

BICYCLE RACKS

This application is directed to a modification of the invention described in U.S. Ser. No. 284,107 filed Aug. 28, 1972.

FIELD OF INVENTION AND BACKGROUND

The present invention is directed to a rack for bicycles. More particularly, the invention is directed to a rack for receiving and locking bicycles in place and in an upright position.

In the prior art, many racks are available for holding bicycles in an upright position. Moreover, racks or other means are available for locking bicycles to stanchions and to buildings, or the like, preventing removal thereof by other than the rightful owner. All of such designs, however, which are capable of locking are relatively complex and cannot be conveniently installed and utilized at central locations for parking bicycles temporarily.

OBJECTS AND GENERAL DESCRIPTION OF INVENTION

Accordingly, it is a primary object of this invention to provide a bicycle rack for receiving and locking in place bicycles which is inexpensive to manufacture and install and which is simple to use.

It is another object of this invention to provide a bicycle rack for receiving and locking in place bicycles which is adapted to receive bicycles of varying lengths and heights.

It is another object of this invention to provide a bicycle rack for receiving and locking in place bicycles which is locked with a padlock.

These and other objects of this invention will be apparent from the following detailed description particularly with reference to the drawing.

The objects of the present invention are accomplished by the construction of a bicycle rack having a vertical member for securing to a base such as a sidewalk or floor, and horizontal members extending from the vertical member and being substantially parallel with the base for engaging the bicycle frame at or to the rear of the sprockets. A cable is secured at one of its ends to the rack which is of sufficient length to be looped through the front wheel of the bicycle and back to the rack. A bicycle is positioned in the rack in order that its frame for mounting the rear wheel is in association with the horizontal members; the cable is looped through the front wheel, and a padlock or other suitable lock means is passed through the horizontal members and cable and locked.

THE DRAWING AND DETAILED DESCRIPTION OF THE INVENTION

The actual construction of the bicycle rack will be nore readily apparent from the drawing wherein like numerals are employed to designate like parts and wherein -

Figure 1:
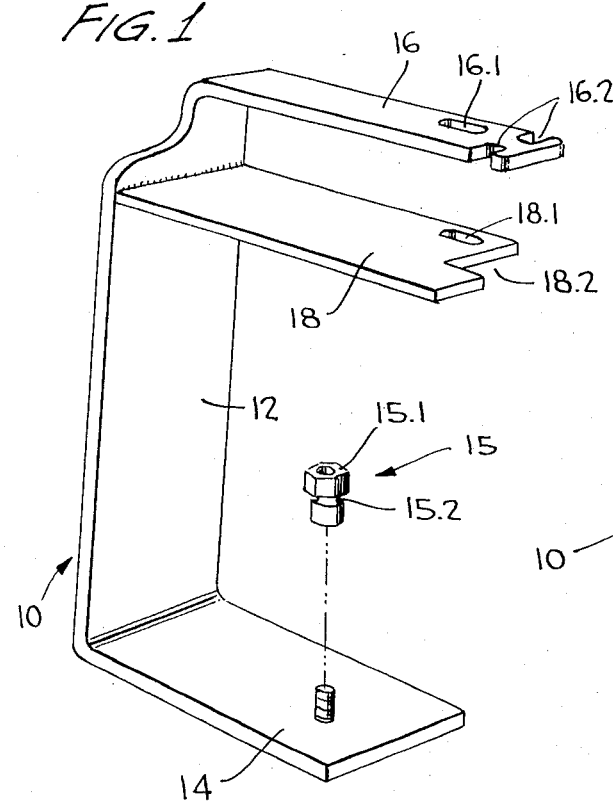
FIG. 1 is a perspective view of the bicycle rack.

Referring to the drawing, rack 10 comprises a vertical member 12 having horizontal extending members 14, 16, and 18. Horizontal member 14 at the lower extreme of member 12 is secured to a base, such as a sidewalk or floor, through bolt 15 which extends through a hole in member 14. The bolt 15 used for securing the rack to the base member preferably will have a breakaway nut, whereby the hex head of the nut 15.1 is not threaded and the shaft 15.2 has a slot cut in it. The slot in the nut is designed in order that upon application of approximately 20 to 30 foot pounds of torque, the hexagonal section of the nut will snap off, leaving only a cylindrical nut on the shaft of the bolt. Horizontal member 16 is integral with the upper extreme end of member 12, and horizontal member 18 is welded to vertical member 12. Member 18 is spaced from member 16 to permit the receiving of U-frame member 31 of a bicycle 30 for mounting the back wheel of the bicycle between said members. Members 16 and 18 have holes 16.1 and 18.1, respectively, at their extreme end for receiving a padlock. Additionally, member 16 has dual and mated notches 16.2 and member 18 has a cutout of approximately 1-inch 18.2 for receiving a standard shackle padlock. Although not fully clear from the drawing, the rack tilts at a 10° angle off vertical to coincide with the angle of a bicycle's rear frame.

Figure 2:
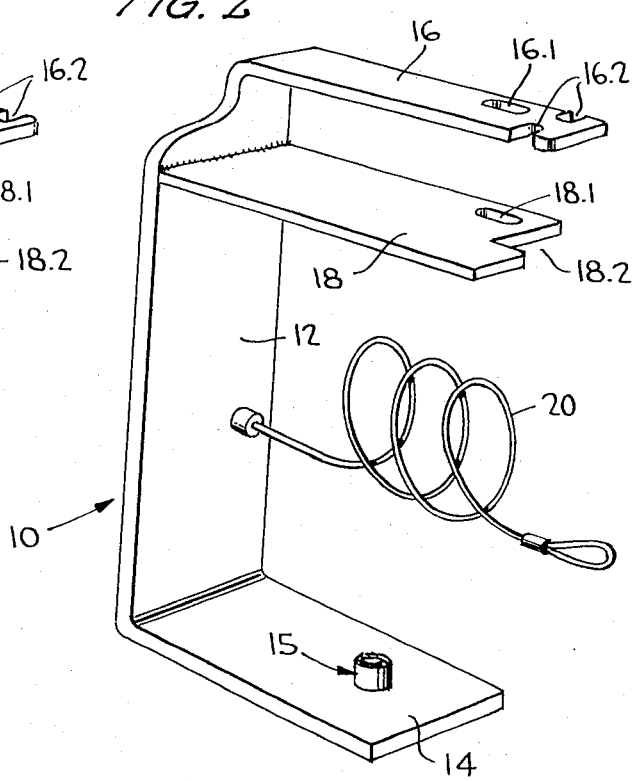
FIG. 2 is the rack of FIG. 1 in combination with cable means of sufficient length for passing through the front wheel of the bicycle.
Figure 3:
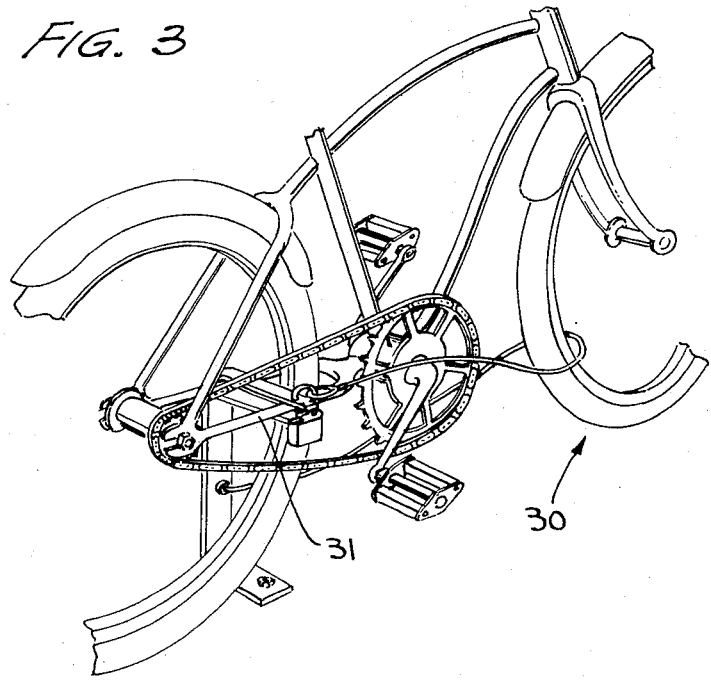
FIG. 3 is a view of the rack of FIG. 2 showing a bicycle positioned in the rack.

As seen in FIGS. 2 and 3, a cable 20 is secured to the rack. In the embodiment shown in FIGS. 2 and 3, the cable is secured to vertical member 12. As will be apparent, however, the cable member can be secured to horizontal member 16 or base member 14. The cable having an eye loop, or loops, at its extreme end from the point of attachment to the rack is of sufficient length to pass through the front wheel of a bicycle positioned in rack 10 and to permit its being looped back to be positioned between holes 16.1 and 18.1 or in the shackle of the padlock positioned in or on member 16 at 16.2

As seen in FIG. 3, a bicycle 30 is positioned in rack 10 by passing the U-bar member 31 which mounts the rear wheel on the bicycle between members 16 and 18. Cable 20 is looped around the front wheel and back to the rack member where either a long shackle padlock is passed through hole 16.1, through an eye in the cable, and through hole 18.1. This provides a secure locking of the bicycle in the upright position. Moreover, as a result of cable 20, it is not possible to remove the front wheel of the bicycle.

As will be apparent to one skilled in the art, the improved bicycle rack made in accordance with the present invention can have various modifications without departing from the inventive concept herein disclosed. Thus, in accordance with the embodiment shown in the drawing, the vertical member 12 can be attached to the concrete by positioning the member directly into fresh concrete. Furthermore, instead of having horizontal member 16 integral with horizontal member 12, member 18 can be integral with member 12, and member 16 suitably attached to member 12 by welding; bolt means, or the like. When using bolt means, it may be desirable to have the width of the space between members 16 and 18 variable. These and other design modifications will be apparent to one skilled in the art and fall within the scope of the present invention.

It is claimed:

1. A bicycle rack for receiving and locking bicycles in place and in an upright position comprising an upstanding member having means fixedly securing the same to base means, and horizontal members fixedly secured to and extending from a top portion of said upstanding member at one side thereof, said horizontal members being substantially parallel to each other and overlying each other in an upright direction, said horizontal members being vertically spaced apart a distance sufficient to receive a frame member of a bicycle therein, and means for securing a padlock simultaneously to free ends of said horizontal members remote from said upstanding member, said horizontal members being of a length sufficient to span the width of a bicycle frame.

2. The bicycle rack of claim 1 wherein said means for securing a padlock is a hole in each of said horizontal members, said holes being aligned for receiving a padlock shackle.

3. The bicycle rack of claim 1 wherein said means for securing a padlock is a cutout in the lower of said parallel members and mated notches in said top member for receiving the shackles of a padlock.

4. The bicycle rack of claim 3 wherein said means for securing a padlock also include a hole in each of said horizontal members, said holes being aligned for receiving a padlock shackle.

5. The bicycle rack of claim 1 including cable means in combination therewith secured at one end to said rack, said cable means being of sufficient length for looping through the front wheel of a bicycle having a rear frame member thereof positioned in said rack and for returning to said rack at the extreme ends of said horizontal members.

6. The bicycle rack of claim 1 wherein the means for securing the upstanding member to base means includes a horizontal base member at the lower end of said upstanding member for securing said rack to said base means.

7. The bicycle rack of claim 6 wherein said horizontal base member has a hole for receiving a bolt for securing said rack to said base means, and said bolt having a break-away hex nut, said break-away hex nut having a slot cut in the nut whereby the hex nut will snap upon assertion of a greater than a pre-determined torque.

8. The bicycle rack of claim 1 wherein said horizontal members are vertically spaced for receiving a rear horizontal bicycle frame member.

9. The bicycle rack of claim 1 wherein the means for securing the upstanding member to base means includes a horizontal base member at the lower end of said upstanding member for securing said rack to said base means, said base member, said upstanding member and one of said horizontal members being continuous portions of a single member with said base member and said one horizontal member being directly connected to opposite ends of said upstanding member by integral bends.

* * * * *